Nov. 15, 1949  G. R. TREMOLADA  2,487,905
ROTARY SWIVEL HAVING IMPROVED MEANS FOR
RELIEVING PRESSURE ON THE PACKING
Filed March 23, 1945  3 Sheets-Sheet 1

INVENTOR.
GUGLIELMO R. TREMOLADA
BY
ATTORNEY

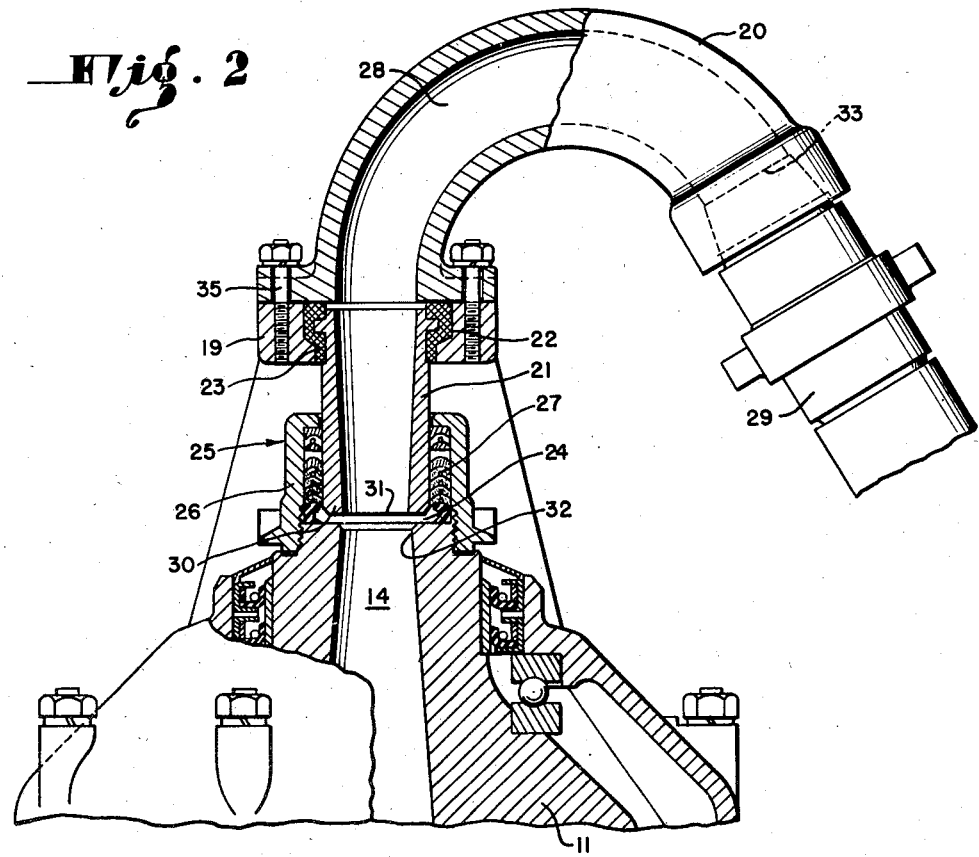
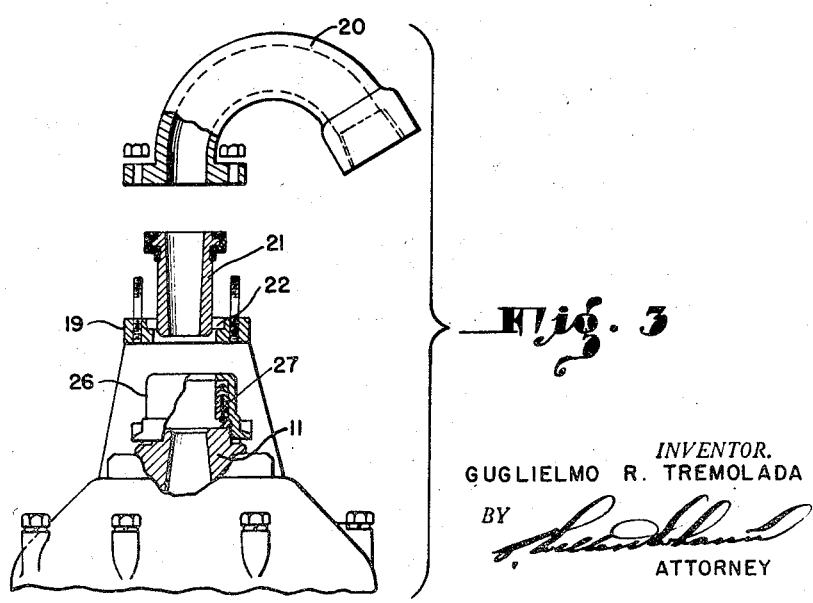

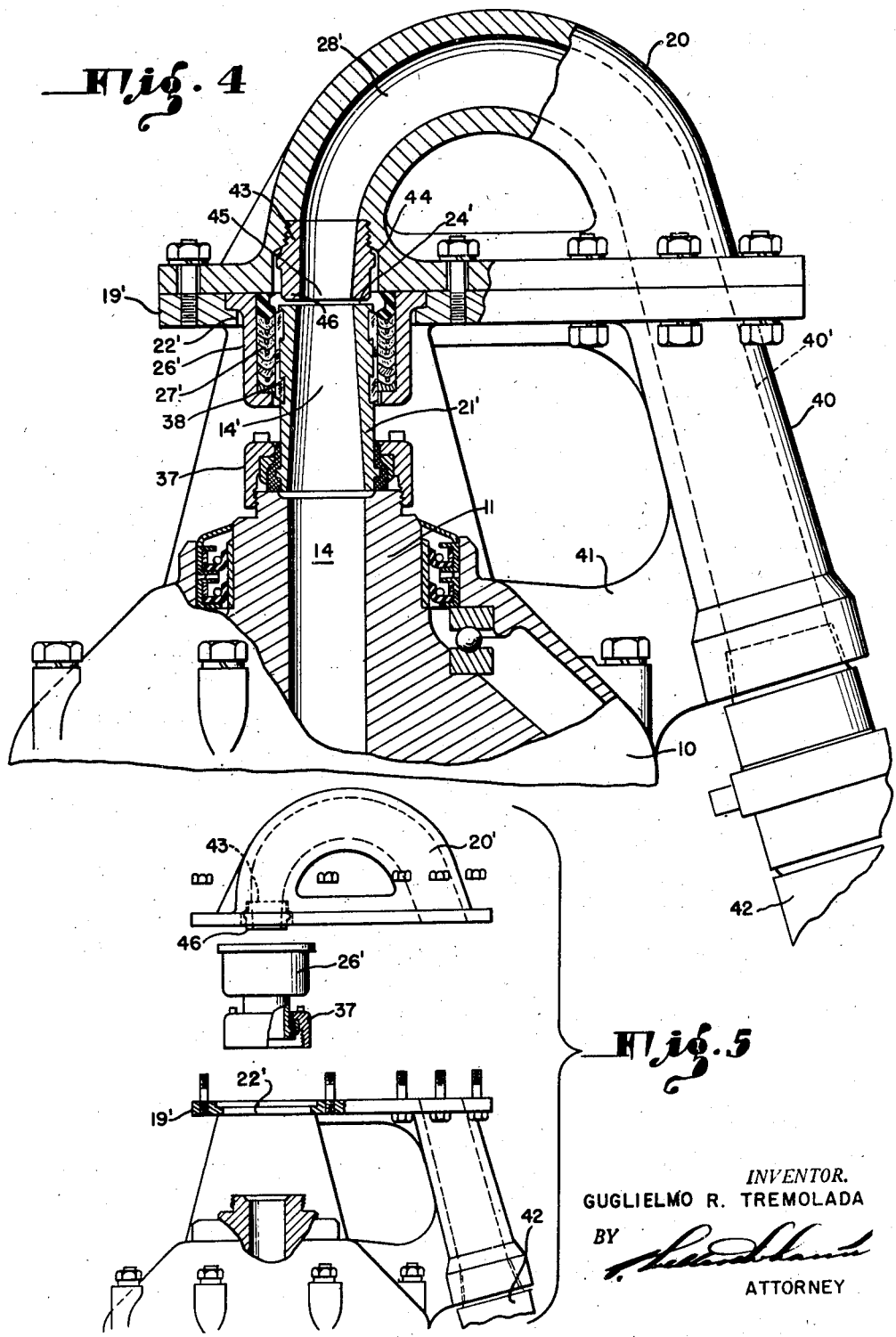

Patented Nov. 15, 1949

2,487,905

UNITED STATES PATENT OFFICE 2,487,905

ROTARY SWIVEL HAVING IMPROVED MEANS FOR RELIEVING PRESSURE ON THE PACKING

Guglielmo R. Tremolada, Los Angeles, Calif., assignor to Emsco Derrick & Equipment Company, Los Angeles, Calif., a corporation of California Application March 23, 1945, Serial No. 584,371

7 Claims. (Cl. 285—97.1)

My invention relates in general to rotary swivels such as used in rotary well drilling to support a string of drill pipe, and relates in particular to an improvement in means for conducting fluid, such as drilling mud, from the stationary to the rotatable part of the swivel.

In rotary swivels the mud is conducted through a mud inlet member, commonly referred to as the gooseneck, to a passage in the rotating body of the swivel, which passage communicates with the upper end of the string of the drill pipe, with a packing device for preventing escape of mud from the joint which exists between the relatively non-rotating parts of the swivel and the rotating part of the swivel. Owing to severe working conditions—including the high pressure applied to the mud—these packed joints of rotary swivels give considerable trouble due to rapid failure of the packing. It is an object of my present invention to provide a rotary swivel having a packed joint which will give satisfactory service for relatively long periods of time as compared to the service now rendered by the packing means of rotary swivels.

It is an object of the invention to provide a rotary swivel having an efficient packing means but which has means for reducing the fluid pressure in the aperture of the packed joint, thereby reducing the pressure against the packing and decrease the rate of wear of the packing.

A further object of the invention is to provide a simple wash pipe arrangement which cooperates with other elements in a rotary swivel to produce a reduction in the pressure against the packing, certain of these parts which are worn by the mud flow being so related to the parts which cooperate therewith as to be readily and economically replaced.

An object of the invention is to provide a rotary swivel having a mud inlet passage leading to a packed joint through which the mud inlet passage communicates with the mud outlet passage of the rotary swivel, this mud inlet passage being reduced in diameter adjacent the annular aperture of the packed joint so as to produce an increase in the velocity of the mud flow which will accomplish a reduction in fluid pressure in the joint aperture and thereby reduce the fluid pressure which must be held by the packing.

A further object of the invention is to provide in a rotary swivel a cooperation of parts contributing to ease in removal and replacement of the wear receiving parts of the improved mud joint and the pressure reducing means associated with the same.

Further objects and advantages of the invention will be brought out in the following part of the specification.

Referring to the drawings which are for illustrative purposes only,

Fig. 2 is an enlarged fragmentary section showing the upper part of the swivel.

Fig. 3 is a view showing certain parts of the swivel separated, to illustrate the manner of removal and replacement of wear receiving parts.

Fig. 4 is an enlarged fragmentary sectional view of an alternative form of my invention.

Fig. 5 is a fragmentary view showing the manner in which parts are replaced in the form of the invention disclosed in Fig. 4.

Figure 1:
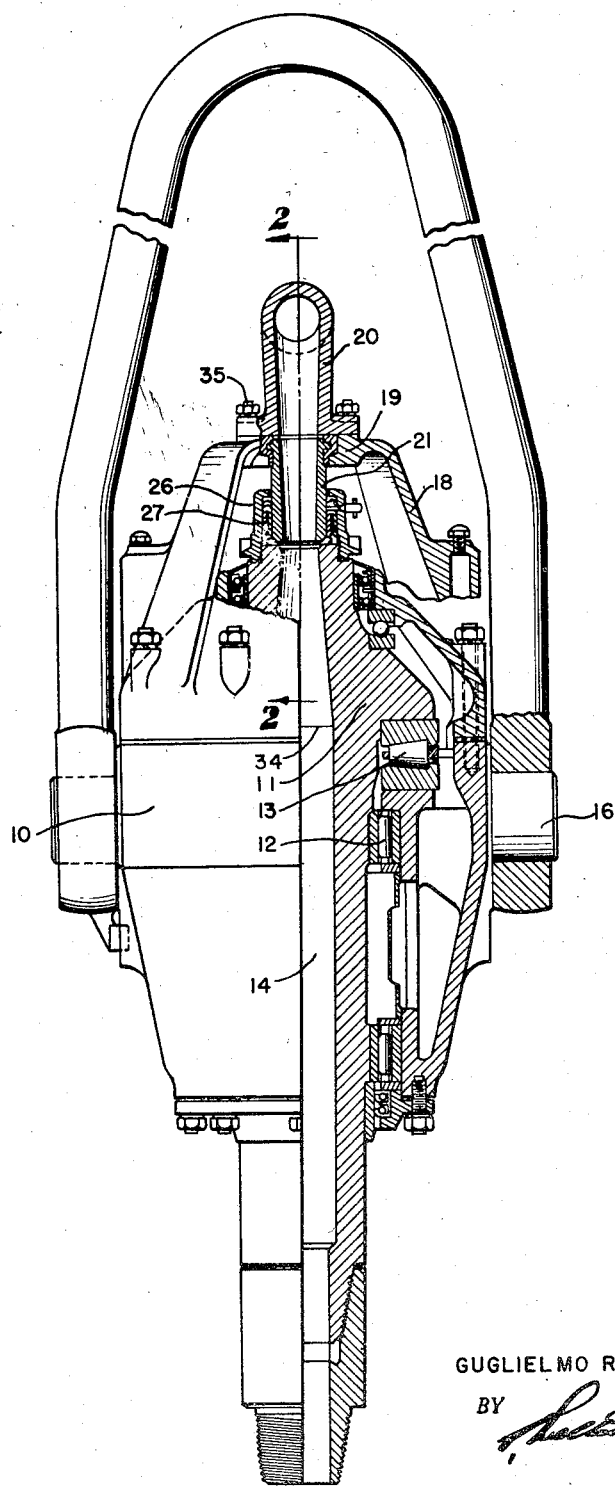
Fig. 1 is a partly sectioned elevational view of a swivel embodying my invention.

In Fig. 1 I show a rotary swivel comprising a shell 10 and a body 11 supported in the shell for relative rotation by radial bearings 12 and thrust bearings 13. The body 11 has an axial opening 14 extending from top to bottom thereof, this opening 14 being referred to hereinafter as the outlet mud passage of the rotary swivel, for the reason that it serves as a means for conveying mud to the upper end of a string of drill pipe which may be connected to the lower end of the body by a fitting 15. The shell 10 is shown with trunnions 16 for attachment to the shell of a bail 17.

The shell 10 has upwardly converging walls 18 which connect at their upper ends to a horizontal supporting wall 19, so called for the reason that this wall 19 provides a support for a gooseneck 20 and for a wash pipe 21 which extends downwardly from the supporting wall 19 toward the upper end of the body 11.

As shown to enlarged scale in Fig. 2, the supporting wall 19 has an opening 22 which is counterbored in alignment with the mud outlet passage 14 of the body 11, to receive an annular rubber wall 23 which is molded upon the upper end of the wash pipe 21, thereby supporting the wash pipe 21 in its operative position. The annular rubber body 23 provides a yieldable support for the wash pipe 21 to compensate for all disalignments which may exist between the opening 22 and the parts which are carried by the body 11 so as to engage the wash pipe 21. The lower end of the wash pipe 21 confronts the upper end of the body 11 and between the members 21 and 11 an annular joint aperture 24 is formed, this joint aperture 24 being sealed against escape of mud therethrough by packing means 25 comprising a hollow fitting 26 which is threaded onto the upper end of the body 11 and carries therein an assembly of packing rings 27 in engagement with the lower portion of the outer face of the wash pipe 21.

The gooseneck 20 defines a mud inlet passage 28 and the wash pipe 21 defines a continuation of the mud inlet passage 28 through which the rotary mud is conducted to the upper end of the mud outlet passage 14 from the rotary hose 29, which is ordinarily employed in the drilling of wells by the rotary method. One of the features of the invention resides in the restriction or diametral reduction of the outlet end 30 of the mud inlet passage 28 so as to increase the velocity of the mud flow as it passes across the joint aperture 24, thereby reducing the fluid pressure in the joint aperture 24 and correspondingly reducing the pressure applied to the rings 27 of the packing means 25. The outlet end 30 of the passage 28 is defined by an annular shoulder 31, which forms part of the wash pipe 21, and which is of smaller diameter than the upper or inlet end 32 of the passage 14. As the mud flow passes across this shoulder 31 and enters the passage 14, a pressure drop is produced in the annular joint aperture 24.

In the showing in Fig. 2 the mud inlet passage 28 is gradually reduced in diameter from a point which is remote from the joint aperture 24, to a point adjacent the mud aperture 24. The mud inlet passage 28 has its largest diameter at the inlet end 33 of the gooseneck 20 and has its smallest diameter at the shoulder 31. In view of this, there is an increase in the velocity of the mud flow from the time it enters the gooseneck 20 until the joint aperture 24 is reached, and then beyond, or below, the joint aperture 24 the velocity of the mud flow is reduced. As shown in Figs. 1 and 2, the upper end of the mud outlet passage 14 is gradually diametrally enlarged until a point 34 spaced from the joint aperture 24 is reached, the passage 14 being thereafter of substantially constant diameter. During drilling operations the body 11 and the packing means 25 rotate relatively to the wash pipe 21 and the rings 27 slide upon the surface of the wash pipe 21. The reduction in pressure in the annular joint aperture 24, produced in the manner described in the foregoing, in turn reduces the pressure of the packing rings 27 against the surface of the wash pipe 21. This reduction in pressure reduces the rate of wear between the packing rings 27 and the wash pipe 21 and correspondingly extends the life of these parts. An important element of the invention to be here considered is that the extension of the life of the wearing parts 21 and 27 is not in direct proportion to the reduction in pressure in the joint aperture, but the extension of the life of these wearing parts is proportionately considerably greater than the pressure reduction in the aperture 24.

The gooseneck 20 is secured to the supporting wall 19 by bolts 35 which permit removal of the gooseneck 20 from the wall 19 as shown in Fig. 3, thereby exposing the upper end of the opening 22 so that the wash pipe 21 may be lifted upwardly through the opening 22 and replaced by a new or reconditioned wash pipe when wear makes this necessary. When the wash pipe 21 is lifted, as shown in Fig. 3, the fitting 26 of the packing means 25 may be unscrewed from the upper end of the body 11 and removed so that the assembly of packing rings 27 therein may be renewed.

In the form of the invention shown in Fig. 4, the wash pipe 21' is fixed on the upper end of the body 11 so as to rotate therewith and the upper end of the wash pipe 21' rotates within an assembly of packing rings 27 which are supported within a shell or fitting 26' which is carried by the supporting wall 19', the upper end of the shell 26' being flanged and the opening 22' of the supporting wall 19' being of such diameter as to accommodate passage therethrough of the lower portion of the shell 26' and of the internally threaded attachment ring 37 by which the wash pipe 21' is secured to the upper end of the body 11. The upper portion of the wash pipe 21' has thereon a layer of hard, wear-resisting material 38, such as glass, for example, to engage the inwardly exposed edges of the packing rings 27'.

The supporting wall 19' is extended laterally and is integral with a tubular mud inlet member 40 which is rigidly held in place by reason of its connection to the supporting wall 19' and its connection to the shell 10 of the swivel by a web 41. The rotary hose 42 is connected to the lower end of the mud inlet member 40 and the downward pull, due to the weight of the rotary hose 42, is taken directly by the inlet member 40. In this form of the invention a gooseneck member 20' is provided which is adapted to be bolted against the upper face of the supporting wall 19', this gooseneck member 20' having therein a mud inlet passage 28', the outer end of which communicates with the upper end of the passage 40' of the member 40 and the other end of which is aligned with the wash pipe 21'.

The outlet end of the mud inlet passage 28' is defined by an insert 43 which is threaded into a recess 44 in the member 20', and this insert or nipple 43 defines a nozzle opening 45 of reduced diameter in alignment with the upper end of the wash pipe 21'. The insert 44 has at its lower end a shoulder 46 which is smaller than the upper end of the passage 14' of the wash pipe 21', and between the upper end of the wash pipe 21' and the lower end of the insert 43 there is an annular joint aperture 24' which communicates with the upper end of the assembly of packing rings 27'. The increase in velocity of the mud flow as it passes from the opening 45 of the insert 43, and its characteristic action, produces a pressure reduction in the joint aperture 24'. The mud inlet passage 28', which is regarded as including the opening or passage 45 of the insert 43, is reduced from a maximum diameter remote from the joint aperture 24' to a minimum diameter adjacent the joint aperture 24', this diametral reduction of the passage 28' being gradual and producing the desired gradual increase in the velocity of the mud flow as the shoulder 46 of the insert 43 is approached. The passage 14' of the wash pipe 21' is gradually diametrally increased as it progresses downwardly from the joint aperture 24' and the lower end of the passape 14' has a diameter substantially the same as that of the mud outlet passage 14 of the body 11, of which the passage 14' is an upward extension.

In the form of the invention shown in Fig. 4, all of the parts subjected to wear are readily replaceable. The insert 43, although it may be made of hard material, is subject to the wear produced by the high velocity flow of mud. The upper portion of the wash pipe 21' is also exposed to a relatively high velocity flow of mud. At suitable intervals, the parts 21' and 43 may be replaced. In Fig. 5 the manner of disassembly of the upper portion of the swivel assembly is shown. The gooseneck member 20' may be removed without necessity of disconnecting the rotary hose 42, thereby exposing the opening 22' in the supporting member 19'. The holding ring 37, Fig. 4, may be unscrewed from the upper end of the body 11, whereupon the wash pipe 21', the shell 26', the assembly of packing rings 27' therein, and the holding ring 37 may be lifted through the opening 22'. Also, when the gooseneck member 20' is removed, as shown in Fig. 5, the insert 43 is exposed for inspection or replacement.

I claim as my invention:

1. In a rotary swivel, the combination of: a shell and a body in rotatable relation, said body having a wall forming a mud passage and said shell having a mud passage, said passages being disposed in end to end relation so that a joint aperture is formed therebetween, said joint aperture having a mouth exposed to the flow of mud through said passages, and said passages being reduced in diameter adjacent to the mouth of said joint aperture so as to increase the velocity of the mud flow across the mouth of said joint aperture and thereby produce a reduction in the pressure of mud in said joint aperture; and packing means for said joint aperture for sealing the same.

2. In a rotary swivel, the combination of: a shell and a body in rotatable relation, said body having a wall forming a mud passage and said shell having a mud passage, said passages being disposed in end to end relation so that a joint aperture is formed therebetween, said joint aperture having a mouth exposed to the flow of mud through said passages, said passages each being gradually reduced from a maximum diameter remote from the mouth of said joint aperture to a minimum diameter adjacent the mouth of said joint aperture so as to increase the velocity of the mud flow across the mouth of said joint aperture and thereby produce a reduction in the pressure of mud in said joint aperture; and packing means for said joint aperture for sealing the same.

3. In a rotary swivel, the combination of: a shell and a body in rotatable relation, said body having a wall forming a mud passage and said shell having a wall forming a mud passage, one of said passages being a mud inlet passage which receives the mud under pressure from the mud pump and the other of said passages being a mud outlet passage adapted to be connected to the drill pipe so as to deliver the mud thereto, said passages being disposed in end to end relation so that a joint aperture is formed therebetween having a mouth exposed to the flow of mud through said passage means, said mud inlet passage being gradually reduced from a relatively large diameter remote from the mouth of said joint aperture to a relatively small diameter adjacent the mouth of said joint aperture so as to increase the velocity of the mud flow across the mouth of said joint aperture and thereby produce a reduction in pressure of the mud in said joint aperture; and packing means for said joint aperture for sealing the same.

4. In a rotary swivel, the combination of: a shell and a body in rotatable relation, said body having a wall forming a mud passage; walls forming a gooseneck supported by said shell and a wash pipe aligned with said mud passage of said body so as to form between said wash pipe and said passage a joint aperture having a mouth exposed to the flow of mud through said passage means, said gooseneck and said wash pipe being so formed as to define a mud inlet passage which is decreased in diameter adjacent the mouth of said joint aperture so that there will be an increase in velocity of the mud flow as it passes across the mouth of said joint aperture and a consequent reduction in the fluid pressure in said joint aperture; and packing means for said joint aperture.

5. In a rotary swivel, the combination of: a shell and a body in rotatable relation, said body having a wall forming a mud outlet passage; walls forming a gooseneck supported by said shell and a wash pipe aligned with said mud passage of said body so as to form between said wash pipe and said passage a joint aperture having a mouth exposed to the flow of mud through said passage means, said gooseneck and said wash pipe being so formed as to define a mud inlet passage, said inlet and said outlet passages each being gradually reduced from the mouth of a maximum diameter remote from said joint aperture to a minimum diameter adjacent the mouth of said joint aperture so that there will be an increase in velocity of the mud flow as it passes across the mouth of said joint aperture and a consequent reduction in the fluid pressure in said joint aperture; and packing means for said joint aperture.

6. In a rotary swivel, the combination comprising: a tubular stationary part; a tubular rotary part, said parts being positioned in end-to-end relation with their confronting ends axially aligned and spaced apart to form an annular aperture; a hollow member carried by one of said parts extending over the adjacent end of the other part and cooperating with its adjacent exterior surface to form an annular packing receiving space in communication with said annular aperture; a packing within said packing space; and interior walls within said parts respectively forming fluid passageways of gradually decreasing diameter with their smallest diameters at opposite sides of said annular aperture, whereby fluid flow through said passageways acts through said annular aperture with reduced pressure upon said packing.

7. In a rotary swivel, the combination comprising: a tubular stationary part; a tubular rotary part, said parts being positioned in end-to-end relation with their confronting ends axially aligned and spaced apart to form an annular aperture; a hollow member carried by one of said parts extending over the adjacent end of the other part and cooperating with its adjacent exterior surface to form an annular packing receiving space in communication with said annular aperture; a packing within said packing space; and interior walls within said parts respectively forming fluid passageways of gradually decreasing diameter with their smallest diameters at opposite sides of said annular aperture, the length of the second fluid passageway in said parts in the direction of flow of said fluid therethrough being of greater length than the first fluid passageway in said parts, whereby fluid flow through said passageways acts through said annular aperture with reduced pressure upon said packing.

GUGLIELMO R. TREMOLADA.

REFERENCES CITED

The following references are of record in the file of this patent:

UNITED STATES PATENTS

| Number | Name | Date |
| --- | --- | --- |
| 794,499 | Hageman | July 11, 1905 |
| 1,617,776 | Taylor | Feb. 15, 1927 |
| 1,937,050 | Tremolada | Nov. 28, 1933 |
| 2,176,323 | Bowen et al. | Oct. 17, 1939 |
| 2,237,715 | Shaw et al. | Apr. 8, 1941 |
| 2,459,472 | Tremolada | Jan. 18, 1949 |